United States Patent
Frye

(10) Patent No.: US 8,119,949 B2
(45) Date of Patent: Feb. 21, 2012

(54) LASER CUTTING SHAPED HOLES BY TREPANNING ON THE FLY

(75) Inventor: Lowell Frye, Chandler, AZ (US)

(73) Assignee: Honeywell International Inc., Morristown, NJ (US)

( * ) Notice: Subject to any disclaimer, the term of this patent is extended or adjusted under 35 U.S.C. 154(b) by 691 days.

(21) Appl. No.: 12/323,726

(22) Filed: Nov. 26, 2008

(65) Prior Publication Data

US 2010/0126973 A1    May 27, 2010

(51) Int. Cl.
*B23K 26/38* (2006.01)
(52) U.S. Cl. .............. 219/121.71; 219/121.72
(58) Field of Classification Search . 219/121.67–121.72
See application file for complete search history.

(56) References Cited

U.S. PATENT DOCUMENTS

| | | | |
|---|---|---|---|
| 4,032,743 A | 6/1977 | Erbach et al. | |
| 4,317,023 A | 2/1982 | Gryskiewicz | |
| 4,377,736 A | 3/1983 | Daunt et al. | |
| 4,608,480 A | 8/1986 | Bizot et al. | |
| 4,948,940 A | 8/1990 | Ruckl | |
| 4,952,789 A | 8/1990 | Suttie | |
| 5,037,183 A | 8/1991 | Gagosz et al. | |
| 5,043,553 A | 8/1991 | Corfe et al. | |
| 5,826,431 A | 10/1998 | Makino et al. | |
| 5,925,271 A * | 7/1999 | Pollack et al. | 219/121.74 |
| 6,130,405 A | 10/2000 | Loringer | |
| 6,359,254 B1 | 3/2002 | Brown | |
| 6,501,045 B1 | 12/2002 | Bernstein et al. | |
| 6,734,390 B1 | 5/2004 | Frye | |
| 6,809,288 B2 | 10/2004 | Faour | |
| 6,931,991 B1 | 8/2005 | Cheng et al. | |
| 7,217,448 B2 * | 5/2007 | Koyo et al. | 428/131 |
| 7,402,772 B2 * | 7/2008 | Hamada et al. | 219/121.71 |

* cited by examiner

*Primary Examiner* — Samuel M Heinrich
(74) *Attorney, Agent, or Firm* — Ingrassia Fisher & Lorenz, P.C.

(57) ABSTRACT

A method of forming a plurality of shaped holes on a workpiece. The method may include rotating the workpiece about multiple axes relative to a laser beam, and positioning the laser at a first predetermined angle relative to the workpiece. The laser beam is pulsed to form a first plurality of trepan cuts defining a row of metering holes. The laser beam, after adjusting to a next predetermined angle and adjacent a previous row of trepan cuts, is pulsed to create a plurality of rows of trepan cuts wherein each cut in the previous row of trepan cuts is connected to a cut in said subsequent row of trepan cuts. The plurality of rows of trepan cuts are formed in a side-to-side sweeping formation and define a portion of each of the shaped holes. Next, the laser is pulsed in alignment with the metering hole to remove debris from therein.

20 Claims, 5 Drawing Sheets

LASER CUTTING SHAPED HOLES BY TREPANNING ON THE FLY

TECHNICAL FIELD

The inventive subject matter relates to laser cutting of holes, and more particularly to methods of trepanning a plurality of shaped holes into a cylindrical workpiece surface.

BACKGROUND

A gas turbine engine may be used to power various types of vehicles and systems. A gas turbine engine may include, for example, four major sections: a compressor section, a combustor section, a turbine section, and an exhaust section. The compressor section raises the pressure of the air to a relatively high level. The compressed air from the compressor then enters the combustor section, where a ring of fuel nozzles injects a steady stream of fuel into a combustion chamber formed by two liners joined by a dome. The combustor dome may be made of a double wall to provide protection from hot gases. The double walled dome typically has an inner surface that may be referred to as a heat shield. After the injected fuel is ignited in the combustor, the energy of the compressed air significantly increases. The high-energy compressed air from the combustor section then flows into and through the turbine section, causing rotationally mounted turbine blades to rotate and generate energy. The air exiting the turbine section is exhausted from the engine via the exhaust section, and the energy remaining in the exhaust air aids the thrust generated by the air flowing through the bypass plenum.

Because combustors are subjected to high temperatures (e.g., temperatures in excess of 2000° C.), they may have limited service lives. In some cases, combustors may have high heat release rates. Thus, the liner, dome, or heat shield surfaces of the combustor may crack, oxidize, or become distorted. To improve the service life of the combustor the temperature of the liner, dome, or heat shield may be lowered.

Effusion cooling can be used to lower liner, dome, or heat shield temperatures. In this regard, a plurality of effusion holes, which are formed through the combustor liner, direct cooling air from outside of the combustor liner to an inner surface of the combustor liner (e.g., where the combustor liner is exposed to the high temperatures). As a result, the liner is cooled as air flows through each effusion hole and enters the combustor to form an air film to thereby isolate the high temperature gases from the liner. To enhance effusion cooling, the area and shape of effusion holes may be varied from a smaller circular inlet to a larger, diffusion shaped outlet. Varying the area of the effusion holes may cause the air to diffuse so that its velocity is reduced as the air film forms.

It is common practice to use computer targeted lasers to drill holes into metal surfaces, such as when forming effusion holes. Lasers are particularly useful in drilling holes into alloys of metal that are particularly tough to machine. Typically, effusion holes are formed in a combustor liner using percussion-on-the-fly laser machining, whereby a pulsating laser repeatedly strikes the liner until a row of holes are drilled therethrough. In order to improve manufacturing efficiency, the liner may be continuously rotated so that each laser pulse strikes a different hole during each complete rotation. A hole formed in this manner typically has approximately the same diameter as the laser beam. Thus, forming a shaped hole with an outlet having a shape that differs than that of the laser beam may significantly increase drilling time, as many additional laser strikes may be employed to form a single appropriately shaped outlet. Additionally, because a combustor liner may include thousands of these shaped holes, the manufacturing costs of drilling shaped holes using percussion techniques may be prohibitively high.

Hence, it is desirable to have an improved method for forming a plurality of shaped holes on a workpiece, such as a combustor liner to decrease manufacturing time.

BRIEF SUMMARY

The inventive subject matter provides a system and method of forming a plurality of shaped holes on a workpiece having a surface, where the shaped holes each have a metering hole and a diffusion-shaped outlet on the surface.

In an embodiment, and by way of example only, the method includes rotating the workpiece about at least two axes and relative to a laser beam, and positioning the workpiece to a first position where the laser beam is at a first predetermined angle relative to a surface of the workpiece; pulsing the laser beam at the workpiece surface to form a row of a plurality of trepan cuts, each defining a metering hole; continuously repositioning and rotating said workpiece about at least two of five axes and relative to the laser beam, positioning the workpiece to a next position and adjusting a laser beam to a next predetermined angle relative to the workpiece surface and adjacent a previous row of the plurality of trepan cuts, adjusting an intensity of the laser beam so that the laser beam does not interfere with a sidewall of the metering hole, and pulsing said laser beam to create a plurality of rows of trepan cuts wherein each cut in the previous row of trepan cuts is connected to a cut in a subsequent row of trepan cuts, wherein said plurality of rows of trepan cuts are formed in a side-to-side sweeping formation and define a diffusion-shaped outlet of each of the plurality of shaped holes; rotating the workpiece about at least two of 5-axes and relative to the laser beam, and positioning the workpiece back to the first position where the laser beam is at the first predetermined angle relative to the workpiece surface and in alignment with the metering hole; and pulsing the laser beam at the workpiece surface to remove debris from within the metering hole.

In another embodiment, and by way of example only, the method includes positioning a laser beam at a first predetermined angle relative to the workpiece surface; pulsing the laser beam at the workpiece surface while rotating the workpiece relative to the laser beam to form a first plurality of trepan cuts in the workpiece defining a plurality of metering holes; adjusting the positioning of the laser beam from the first predetermined angle to a next predetermined angle relative to the workpiece surface; pulsing the laser beam at the workpiece surface while rotating the workpiece relative to the laser beam to create a plurality of additional rows of trepan cuts, wherein each cut in a previous row of trepan cuts is connected to a cut in a subsequent row of trepan cuts, wherein the plurality of additional rows of trepan cuts are formed in a side-to-side sweeping formation and define a diffusion-shaped outlet of each of the plurality of shaped holes; repeating the steps of adjusting the positioning of the laser beam and pulsing the laser beam at the workpiece surface while rotating the workpiece relative to the laser beam, to form each additional row of trepan cuts, until a first row of shaped holes is formed in the workpiece; adjusting the positioning of the laser beam to the first predetermined angle and positioning the workpiece where the laser beam is at the first predetermined angle relative to the workpiece surface and in alignment with the plurality of metering holes; and pulsing the laser beam at the workpiece surface to remove debris from within the plurality of metering holes.

In yet another embodiment, and by way of example only, the method includes positioning a laser beam at a first predetermined angle relative to the combustor surface by rotating the combustor about at least two of five axes; pulsing the laser beam at the combustor surface while rotating the combustor about an axis relative to the laser beam to form a first plurality of trepan cuts in the combustor that define a plurality of metering holes; adjusting the positioning of the laser beam from the first predetermined angle to a next predetermined angle relative to the combustor surface by rotating the combustor about at least two of five axes; pulsing the laser beam at the combustor surface while rotating the combustor about one axis relative to the laser beam to create a plurality of additional rows of trepan cuts, wherein each cut in a previous row of a plurality of trepan cuts is connected to a cut in a subsequent row of a plurality of trepan cuts, wherein said pluralities of rows of trepan cuts are formed in a side-to-side sweeping formation and define a portion of the diffusion-shaped outlet of each of the plurality of shaped holes; repeating the steps of adjusting the positioning of the laser beam and pulsing the laser beam at the combustor surface while rotating the combustor relative to the laser beam to form each trepan cut, until a first row of shaped holes is formed in the combustor; adjusting the positioning of the laser beam to the first predetermined angle and positioning the combustor where the laser beam is at the first predetermined angle relative to the combustor surface and in alignment with the plurality of metering holes; and pulsing the laser beam at the combustor surface to remove debris from within the plurality of metering holes.

Other independent features and advantages of the preferred methods will become apparent from the following detailed description, taken in conjunction with the accompanying drawings which illustrate, by way of example, the principles of the inventive subject matter.

DETAILED DESCRIPTION

The following detailed description of the inventive subject matter is merely exemplary in nature and is not intended to limit the inventive subject matter or the application and uses of the inventive subject matter. Furthermore, there is no intention to be bound by any theory presented in the preceding background or the following detailed description.

Figure 1:
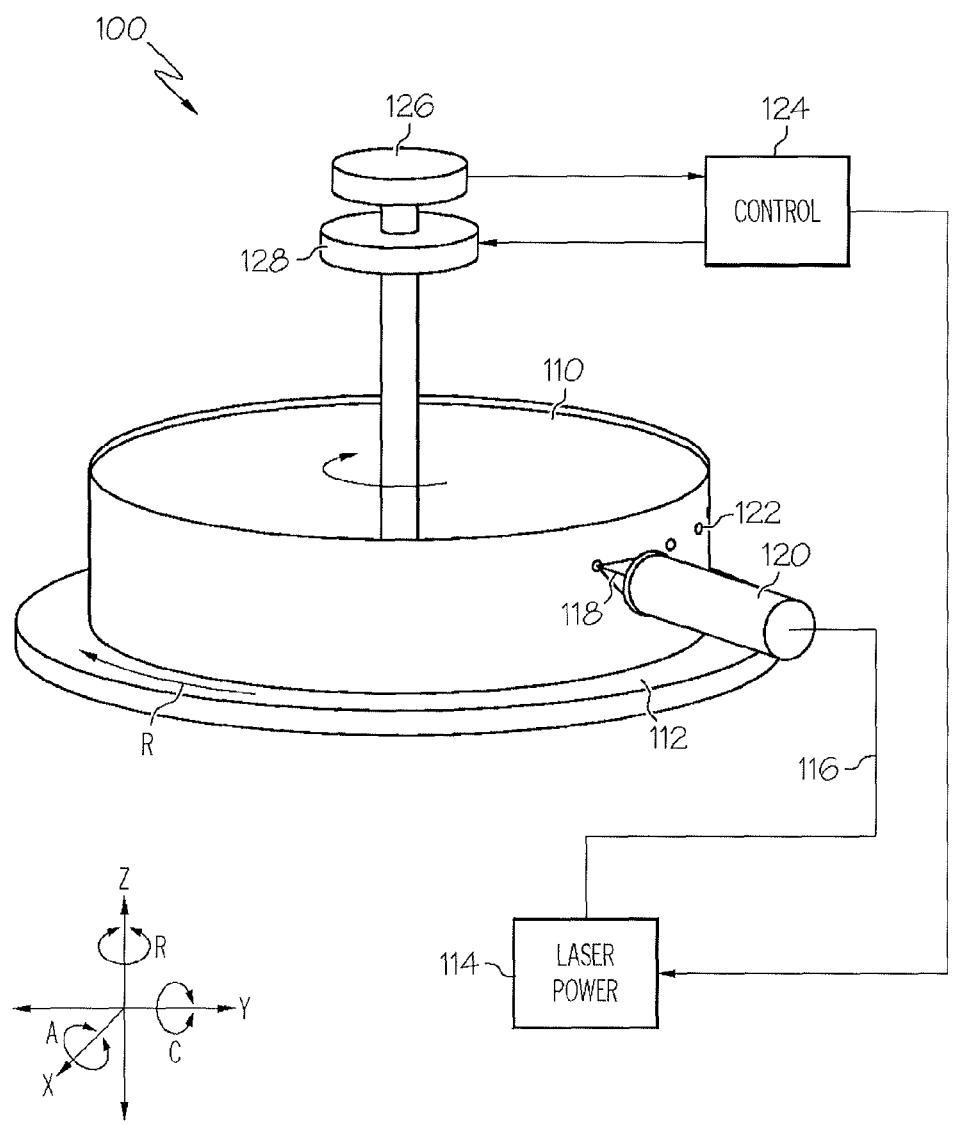
FIG. 1 a simplified schematic of a set up that may be used to form the shaped holes, according to an embodiment.

Referring now to the Figures, FIG. 1 illustrates a laser cutting system 100 in use on a workpiece 110. The workpiece 110 is generally cylindrical in shape and may be a portion of a combustor, such as a combustor dome surface or heat shield, or liner surface. The laser cutting system 100 includes a laser power supply 114 that is configured to pulse a laser beam 116 of laser energy through a laser lens 120 when a shutter 118 is open. Each component of the laser cutting system 100 may be controlled by a controller 124. The controller 124 may be adapted to position the laser lens 120 relative to the workpiece 110, based on feedback that may be received from a position sensor 126. In an embodiment, a drive 128 may be included to coordinate the movement of the table 112 with the positioning of the laser beam 116. In an alternate embodiment, the laser lens 120 may be movable to provide various relative positions between the workpiece 110 and the laser lens 120. The workpiece 110 can be constantly rotated on a table 112 about an axis, as indicated by arrow R. In addition to rotation R, the table 112 can move about or along an additional five axes, including translating along three linear axes (X, Y, Z) and/or rotating about an additional rotational axes (C) to control the trepan position of the laser lens 120 relative to the workpiece 110. In FIG. 1 a rotational axis A is equal to R when C is rotated 90°. As the workpiece 110 rotates, the laser power supply 114 can send a laser pulse 116 of laser energy through the laser lens 120 when the laser shutter 118 is open. Illustrated in FIG. 1 are a number of partially cut shaped holes 122 formed in a row and evenly spaced around the periphery of the workpiece 110. Although the final shaped holes are normally evenly spaced, gaps in this even spacing can be created simply by holding the laser shutter 118 closed to block some pulses to stop the cutting of some of the plurality of shaped holes 122.

Figure 2:
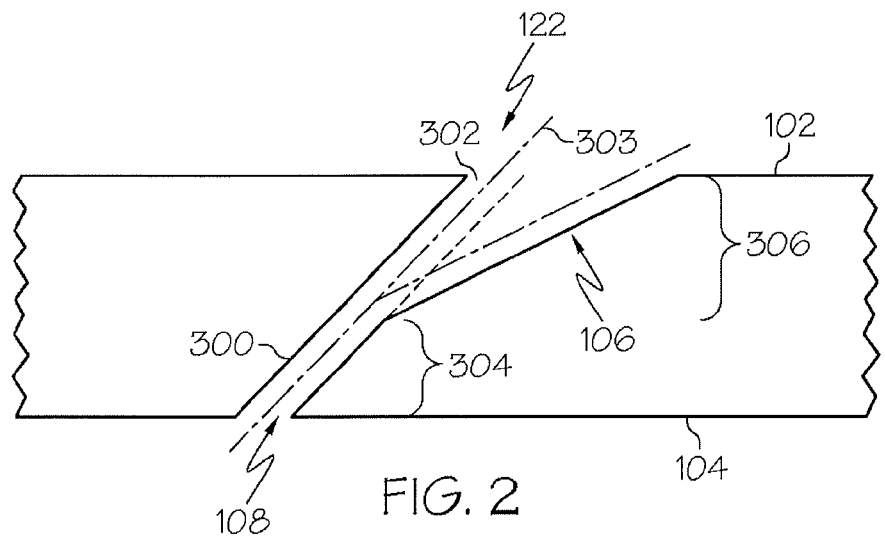
FIG. 2 is a cross-sectional view of a portion of the workpiece including a shaped hole, according to an embodiment.

Referring now to FIG. 2, illustrated is a completed shaped hole 122 formed by the system and according to the method presented herein. Each of the plurality of shaped holes 122 extends between a first surface 102 and a second surface 104 of the workpiece 110 and includes a diffusion-shaped outlet 106 and an inlet 108 formed thereon, respectively. In an alternative embodiment, the first surface 102 may be an outer surface, while the second surface 104 may be an inner surface. A channel 302, defined partially by a metering hole 300 provides communication between the diffusion-shaped outlet 106 and the inlet 108 and is formed such that if a centerline 303 is extended therebetween, the centerline 303 is angled relative to the workpiece first and second surface 102, 104. In an embodiment, the angle between the centerline 303 and the workpiece second surface 104 may be between about 15 and about 30 degrees. Additionally, the channel 302 includes more than one section, where each section has a different cross-sectional shape. For example, in FIG. 2, the cross-sectional shape of a first section 304 may be constant and may be circular, while the cross sectional shape of a second section 306 varies from the first section (circular) to the diffusion-shaped outlet 106. It will be appreciated that each of the plurality of shaped holes 122 may or may not all have substantially the same shape. For example, a first set of shaped holes may have a first shape and the channel 302 may be angled at an angle relative to the workpiece second surface 104, while a second set of shaped holes may have the same shape or a different shape and the channel 302 may be angled at a different angle relative to the workpiece second surface 104.

Figure 4:
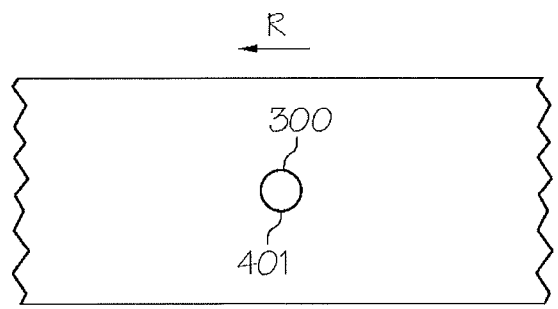
FIG. 4 is a top view of a portion of the workpiece illustrating a step in the method of forming the shaped hole, according to an embodiment.
Figure 5:
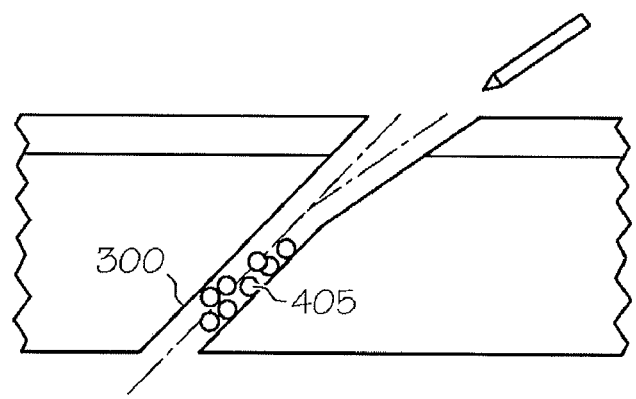
FIG. 5 is a cross-sectional view of a portion of the workpiece illustrating a step in the method of forming the shaped hole, according to an embodiment.
Figure 6:
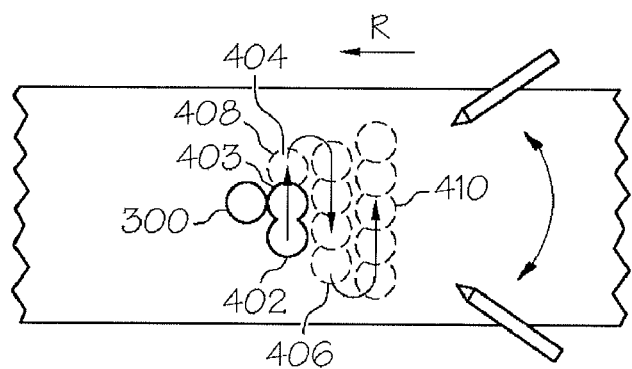
FIG. 6 is a top view of a portion of the workpiece illustrating a step in the method of forming the shaped hole, according to an embodiment.

FIGS. 3-10 illustrate details of how the plurality of shaped holes 122 are formed. More particularly, FIGS. 3, 5, 7, and 9 illustrate side sectional views of a plurality of steps in forming each of the plurality of shaped holes 122. FIGS. 4, 6, 8, and 10 illustrate corresponding top views of each step. The dashed lines illustrated in FIG. 6 represent the trepan path that the laser lens 120 will trace out on the workpiece 110 as the table 112 is moved by the controller 124 in forming the plurality of shaped holes 122. A corresponding flow diagram of a method 500 for forming the diffusion-shaped holes 122 is shown in FIG. 11.

Figure 11:
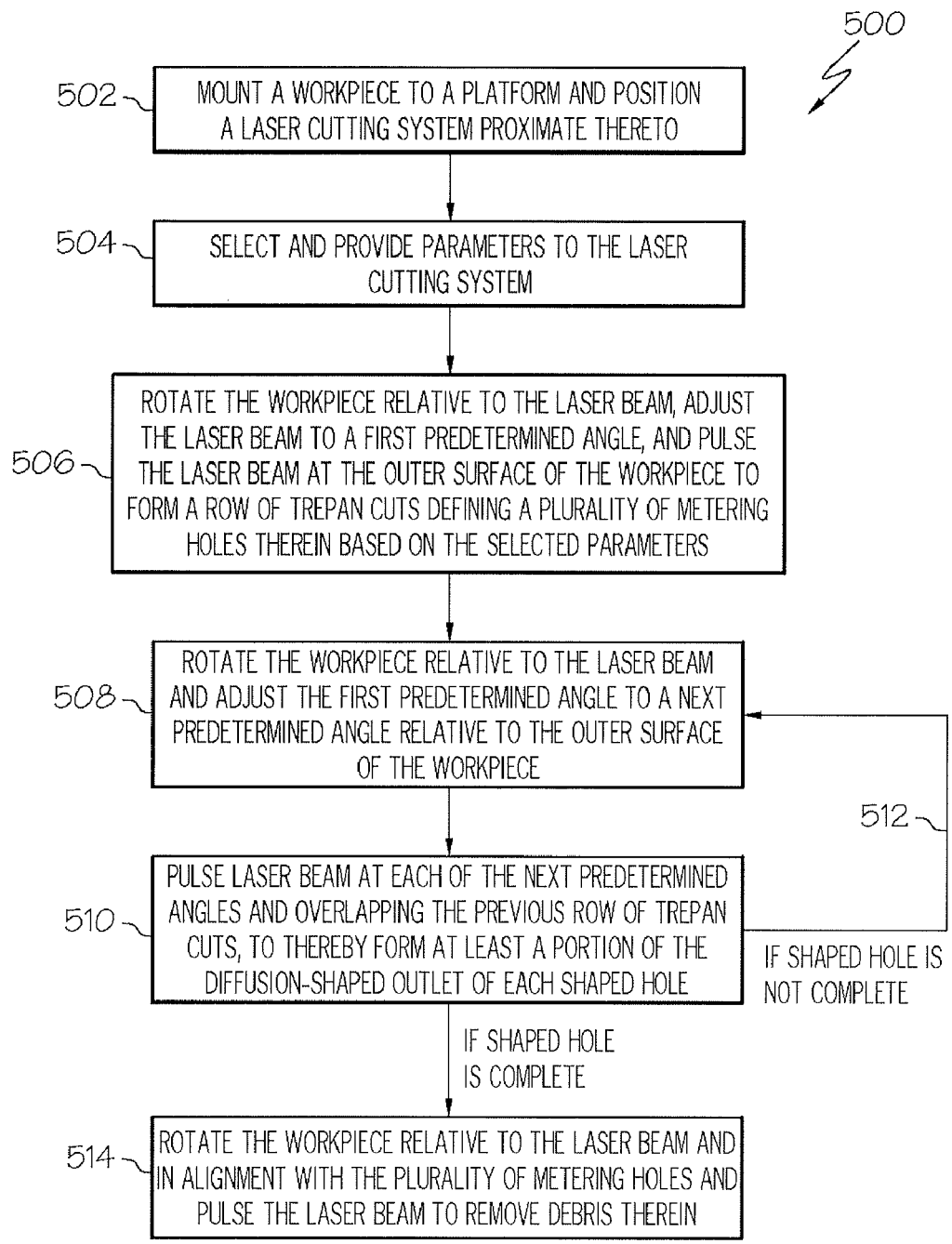
FIG. 11 is a flow diagram of a method of forming the shaped holes, according to an embodiment.

Initially, the method includes mounting the workpiece 110 to a table 112 and positioning the workpiece 110 relative to a laser cutting system 100 proximate thereto, step 502 of FIG. 11. The table 112 can be set to an angle so that any angle of hole might be cut using this arrangement, though not shown it would also be possible to set an angle by moving the laser lens 120. As previously indicated, the workpiece 110 can be constantly rotated via the table 112 about an axis, as indicated by arrow R. In addition to rotation R, the table 112, and thus the workpiece 110, can move about an additional five axes. More particularly, the table 112, and thus the workpiece 110 can translate along three linear axes (X, Y, Z) and rotate about two additional rotational axes (A, C) to control the trepan position of the laser lens 120 relative to the workpiece 110. Accordingly, the laser cutting system 100 can create each of the plurality of shaped holes 122 at any angle relative to the surface of the workpiece 110 including holes angled up or down, left or right or compound angles.

Next, parameters are selected and provided to the laser cutting system, step 504 of FIG. 11. The parameters may include an angle at which the laser beam 116 will cut the workpiece 110 relative to its surface, the size and number of the shaped holes to be cut, hole positions, and the like. In an embodiment, the controller 124 may be configured to provide commands to the table 112 to adjust its positioning to allow the laser beam 116 to be aimed at the workpiece 110 at a first predetermined angle. The predetermined angle, as suggested above, may be an angle that is substantially parallel with a desired centerline 303 (FIG. 2) of a shaped hole 122, or any other suitable angle relative to the surface of the workpiece 110. In an embodiment, the centerline 303 may be angled at an angle that is less than 90 degrees relative to the surface of the workpiece 110. In another embodiment, the centerline 303 may be angled at an angle that is between about 15 and about 30 degrees. The controller 124 may be configured to provide commands to a non-illustrated actuator to reposition the laser lens 120, such that it can supply the laser beam 116 at the predetermined angle.

The desired number and size of the holes can be selected and corresponding instructions may be provided to the laser cutting system 100. In an embodiment, each of the plurality of shaped holes 122 may each have a diameter of between about 0.4 mm and 1.0 mm, and the controller 124 may use the selected parameters to calculate the number of cuts required to form a shaped hole 122. It will be appreciated that the particular number of cuts employed to form a single hole may depend on the selected size of each of the plurality of shaped holes 122, and the intensity of the laser beam 116.

Figure 3:
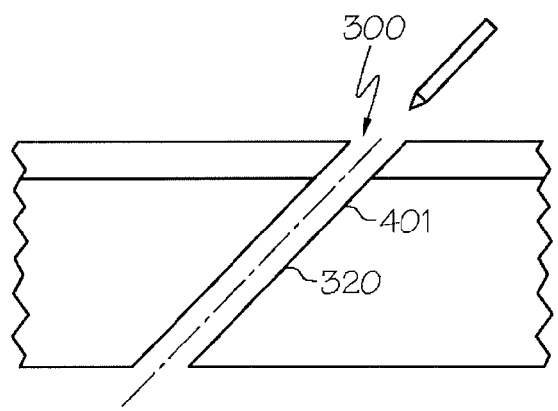
FIG. 3 is a cross-sectional view of a portion of the workpiece illustrating a step in the method of forming the shaped hole, according to an embodiment.

The controller 124 may also use the selected parameters to determine a path along which the laser beam may travel in order to form each of the plurality of shaped holes 122. In one embodiment, the parameters for a first cut 401 defining a metering hole 300 as illustrated in FIGS. 3 and 4 are set, including diameter and required intensity of the laser beam 116 to prevent it from interfering with a sidewall defining the metering holes 300. Additional parameters required to complete each of the plurality of shaped holes 122 may be set including the number of required trepanning cuts 402, 403, 404, etc. A typical shaped hole 122 might require 36 cuts depending upon the diameter of the shaped hole 122. Such a shaped hole 122 would require 36 rotations of the workpiece 110 to complete all of the plurality of shaped holes 122 assuming that each cut 402, 403, 404, etc. passes through the portion of the wall thickness of the workpiece 110 it is intended to pass through. If multiple pulses by the laser beam 116 are required for each cut 402, 403, 404, etc. then this would multiply the number of rotations required. Finally, laser intensity parameters are set for each of the trepanning cuts 402, 403, 404, etc. The coordinates of each trepan position can be calculated and are best illustrated in FIG. 6. In an alternate embodiment, the trepanning cuts 402, 403, 403, etc. are formed in a continuous motion throughout one revolution, The trepanning path as indicated by the dashed lines and directional arrows begins proximate the metering hole position 300. The cuts 402, 403, 404, etc. progress along the path by adjusting the angle of the workpiece 110 so that cuts 402, 403, 404, etc. are formed by "sweeping" a plurality of overlapping cuts to define the diffusion-shaped outlet 106. In contrast to previously disclosed system in which the trepanning cuts define a periphery of a hole, with a central portion of the hole being removed by the periphery cuts, the plurality of cuts 402, 403, 404, etc. are formed by "sweeping" the plurality of overlapping trepanning cuts 402, 403, 404, etc. in a side to side manner. More particularly, the plurality of cuts 402, 403, 404, etc. are formed in a progressively wider degree, from a first side 406 toward a second side 408, beginning at the metering hole 300 and moving toward what will be the shallowest aspect 410 of the shaped hole 122 as illustrated in FIG. 6. In an alternate embodiment, the shaped hole 122 may be formed in an opposite direction after forming a metering hole 300 by beginning at what will be the shallowest aspect 410 of the shaped hole 122 and moving toward the metering hole 300.

Figure 7:
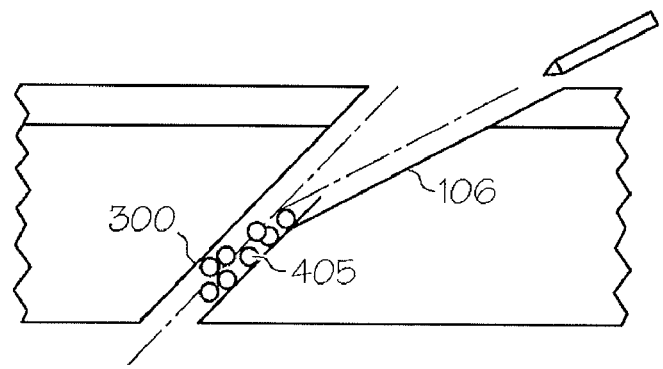
FIG. 7 is a cross-sectional view of a portion of the workpiece illustrating a step in the method of forming the shaped hole, according to an embodiment.
Figure 8:
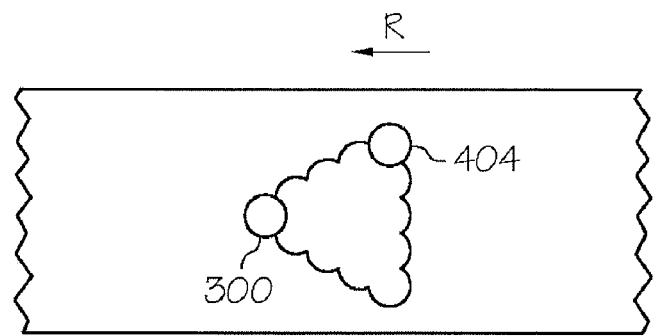
FIG. 8 is a top view of a portion of the workpiece illustrating a step in the method of forming the shaped hole, according to an embodiment.
Figure 9:
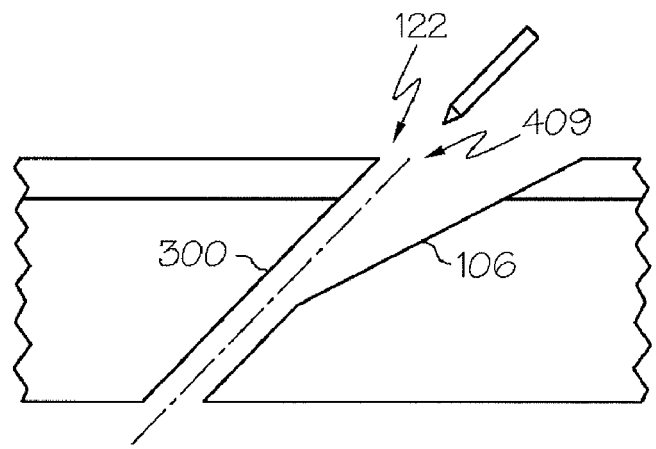
FIG. 9 is a cross-sectional view of a portion of the workpiece illustrating a step in the method of forming the shaped hole, according to an embodiment.
Figure 10:
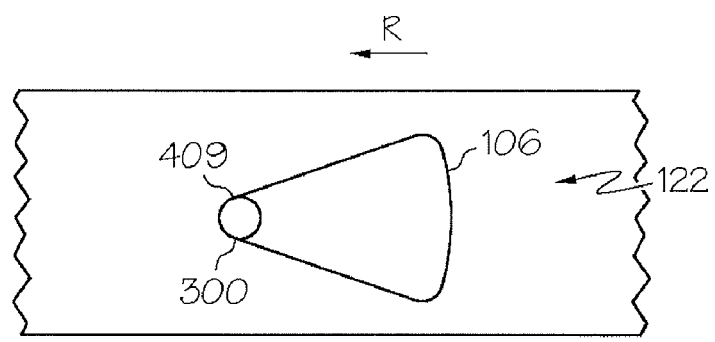
FIG. 10 is a top view of a portion of the workpiece illustrating a step in the method of forming the shaped hole, according to an embodiment.

After the set up parameters are all complete, the workpiece is rotated relative to a laser beam from the laser cutting system 100 and typically about at least two of five axes, and the laser beam, which is disposed at a first predetermined angle relative to the surface of the workpiece, is pulsed at a surface of the workpiece to form a first plurality of spaced trepan cuts defining the metering holes 300 therein, based on the selected parameters, step 506. After the workpiece 110 completes at least one rotation, e.g. 360, and the first set of cuts 401 defining the metering hole 300 are completed, the table 112 can trepan to the next cut locations 402, 403, 404, etc. and so on. The first predetermined angle is adjusted to a next predetermined angle relative to the surface of the workpiece by positioning and rotating the workpiece about at least two of five axes and relative to the laser beam, step 508. The laser beam is then pulsed again to create a second plurality of spaced trepan cuts 402, to thereby form at least a portion of the diffusion-shape of each shaped hole outlet 106 during relative motion between the workpiece and laser beam, step 510. Steps 508 and 510 are then repeated (step 512) until the formation of each hole in the row is completed, such that each hole has the diffusion-shaped outlet 106, and in some embodiments, the metering hole 300. More particularly, when the workpiece 110 completes one rotation forming cuts 401 that define the metering hole 300, the laser lens 120 can trepan to the next location to make cuts 402. Once cuts 402 are made, the workpiece 110 continues to rotate until cuts 403 can be made. The cylindrical workpiece completes another rotation, the laser lens 120 trepans to make cuts 403, and similarly to make cuts 404. As indicated in FIGS. 5 and 6, debris 405 may be formed by the laser cuts 402, 403, 404, etc. and may be collected within the metering hole 300. Subsequent to the final cuts needed to define the diffusion outlet 106 as illustrated in FIGS. 7 and 8, a final cut 409, as best illustrated in FIGS. 9 and 10, is made to clean out debris 405 that may have fallen into the metering hole 300 during the interim cuts. More specifically, the workpiece 100 and the laser beam 116 are adjusted to the first predetermined angle and in alignment with the metering holes 300. The laser beam 116 is then pulsed to remove debris 405 from within the metering holes 300.

Because the duration of the laser pulse is very short (typically about 0.5 milliseconds), the table 112 can be rotated at a constant speed in direction R without stopping the table for each pulse. The laser lens 120 can fire evenly timed pulses creating a series of evenly spaced cuts 401, 402, 403, 404, etc. around the workpiece 110. For thick walled workpieces a plurality of pulses from the laser beam 116 can be used for each trepan location; this would require more than one workpiece rotation per cut. The controller 124 is programmed to check to see if all the programmed cuts 401, 402, 403, 404, etc. have been made. If not, the laser cutting system 100 can perform another set of cuts. Once the plurality of shaped holes 122 are complete, and cuts 401, 402, 403, 404, etc. have been made through the entire path, and the metering holes 300 have been cleared of debris 405, the control sequence can end and the table 112 can shut off and the completed workpiece 110 can be removed.

It should be understood that the controller 124 could control the laser lens 120 to cut out a variety of shapes other than circles, including ellipses, rectangles, and irregular shapes, and would not be limited to a circular path. Also, it should be understood that the process could be used on any rotatable part including cylinders as disclosed but also flat plates, cones, tori, spheres and others that would be obvious to one skilled in the art. While the process of this invention is most applicable to making holes in metals, it could also be used to make holes in other materials, such as plastics, paper and ceramics. Also, while the table trepans in the example shown, the process would work equally well if the laser lens 120 was moved to the trepan positions instead. Further although a laser having a circular cross sectional pulse has been described, the system would also work with a laser having a pulse with a different cross sectional shape such as square.

While the inventive subject matter has been described with reference to a preferred embodiment, it will be understood by those skilled in the art that various changes may be made and equivalents may be substituted for elements thereof without departing from the scope of the inventive subject matter. In addition, many modifications may be made to adapt to a particular situation or material to the teachings of the inventive subject matter without departing from the essential scope thereof. Therefore, it is intended that the inventive subject matter not be limited to the particular embodiment disclosed as the best mode contemplated for carrying out this inventive subject matter, but that the inventive subject matter will include all embodiments falling within the scope of the appended claims.

I claim:

1. A method of forming a plurality of shaped holes in a workpiece, the method comprising the steps of:
   rotating the workpiece about at least two axes and relative to a laser beam, and positioning the workpiece to a first position where the laser beam is at a first predetermined angle relative to a surface of the workpiece;
   pulsing the laser beam at the workpiece surface to form a row of a plurality of trepan cuts, each defining a metering hole;
   continuously repositioning and rotating said workpiece about at least two of five axes and relative to the laser beam, positioning the workpiece to a next position and adjusting a laser beam to a next predetermined angle relative to the workpiece surface and adjacent a previous row of the plurality of trepan cuts, adjusting an intensity of the laser beam so that the laser beam does not interfere with a sidewall of the metering hole, and pulsing said laser beam to create a plurality of rows of trepan cuts wherein each cut in the previous row of trepan cuts is connected to a cut in a subsequent row of trepan cuts, wherein said plurality of rows of trepan cuts are formed in a side-to-side sweeping formation and define a diffusion-shaped outlet of each of the plurality of shaped holes;
   rotating the workpiece about at least two of 5-axes and relative to the laser beam, and positioning the workpiece back to the first position where the laser beam is at the first predetermined angle relative to the workpiece surface and in alignment with the metering hole; and
   pulsing the laser beam at the workpiece surface to remove debris from within the metering hole.

2. The method of claim 1, wherein each step of the method is repeated until each of the plurality of shaped holes includes a circular inlet and the diffusion-shaped outlet.

3. The method of claim 1, wherein the step of rotating comprises rotating the workpiece at least one rotation and the step of adjusting comprises adjusting the first predetermined angle to the next predetermined angle after the workpiece rotates at least one rotation.

4. The method of claim 1, wherein the step of pulsing the laser beam at the workpiece surface to form the first plurality of trepan cuts therein comprises disposing the laser beam at an angle of between about 15 and about 30 degrees relative to the workpiece surface.

5. The method of claim 1, wherein the step of pulsing the laser beam at the workpiece surface to form the first plurality of trepan cuts therein comprises pulsing the laser beam at the workpiece surface to form a first row including the first plurality of trepan cuts.

6. The method of claim 1, wherein the step of pulsing the laser beam at each trepan cut of the first plurality of trepan cuts comprises forming the first plurality of trepan cuts such that each cut is formed through a thickness of the workpiece.

7. The method of claim 1, wherein the workpiece is a combustor.

8. The method of claim 7, wherein the workpiece surface comprises a combustor dome surface or heat shield.

9. The method of claim 7, wherein the workpiece surface comprises a combustor liner surface.

10. A method of forming a plurality of shaped holes on a workpiece having a surface, the plurality of shaped holes each having a diffusion-shaped outlet on the workpiece surface, the method comprising the steps of:

positioning a laser beam at a first predetermined angle relative to the workpiece surface;

pulsing the laser beam at the workpiece surface while rotating the workpiece relative to the laser beam to form a first plurality of trepan cuts in the workpiece defining a plurality of metering holes;

adjusting the positioning of the laser beam from the first predetermined angle to a next predetermined angle relative to the workpiece surface;

pulsing the laser beam at the workpiece surface while rotating the workpiece relative to the laser beam to create a plurality of additional rows of trepan cuts, wherein each cut in a previous row of trepan cuts is connected to a cut in a subsequent row of trepan cuts, wherein the plurality of additional rows of trepan cuts are formed in a side-to-side sweeping formation and define a diffusion-shaped outlet of each of the plurality of shaped holes;

repeating the steps of adjusting the positioning of the laser beam and pulsing the laser beam at the workpiece surface while rotating the workpiece relative to the laser beam, to form each additional row of trepan cuts, until a first row of shaped holes is formed in the workpiece;

adjusting the positioning of the laser beam to the first predetermined angle and positioning the workpiece where the laser beam is at the first predetermined angle relative to the workpiece surface and in alignment with the plurality of metering holes; and pulsing the laser beam at the workpiece surface to remove debris from within the plurality of metering holes.

11. The method of claim 10, wherein each step of pulsing the laser beam at the workpiece surface, adjusting, and pulsing the laser beam at each trepan cut is repeated until a second row of the plurality of shaped holes is formed in the workpiece.

12. The method of claim 10, wherein the step of adjusting comprises adjusting the first predetermined angle to the next predetermined angle after the workpiece rotates at least one rotation.

13. The method of claim 10, wherein the step of adjusting comprises disposing the laser beam at an angle of between about 15 and about 30 degrees relative to the workpiece surface.

14. The method of claim 10, wherein the step of pulsing the laser beam at each trepan cut of the first plurality of trepan cuts comprises forming the first plurality of trepan cuts such that each trepan cut is formed through a thickness of the workpiece.

15. The method of claim 10, wherein the step of pulsing the laser beam at each trepan cut of the plurality of additional rows of trepan cuts comprises forming each of the plurality of additional rows of trepan cuts such that each trepan cut is formed through a portion of a thickness of the workpiece.

16. The method of claim 10, wherein each step of the method is repeated until each shaped hole includes a circular inlet and the diffusion-shaped outlet.

17. The method of claim 10, wherein the workpiece surface comprises a combustor dome surface or heat shield.

18. The method of claim 10, wherein the workpiece surface comprises a combustor liner surface.

19. A method of forming a plurality of shaped holes on a combustor having a surface, the plurality of shaped holes each having a diffusion-shaped outlet on the combustor surface, the method comprising the steps of:

positioning a laser beam at a first predetermined angle relative to the combustor surface by rotating the combustor about at least two of five axes;

pulsing the laser beam at the combustor surface while rotating the combustor about an axis relative to the laser beam to form a first plurality of trepan cuts in the combustor that define a plurality of metering holes;

adjusting the positioning of the laser beam from the first predetermined angle to a next predetermined angle relative to the combustor surface by rotating the combustor about at least two of five axes;

pulsing the laser beam at the combustor surface while rotating the combustor about one axis relative to the laser beam to create a plurality of additional rows of trepan cuts, wherein each cut in a previous row of a plurality of trepan cuts is connected to a cut in a subsequent row of a plurality of trepan cuts, wherein said pluralities of rows of trepan cuts are formed in a side-to-side sweeping formation and define a portion of the diffusion-shaped outlet of each of the plurality of shaped holes;

repeating the steps of adjusting the positioning of the laser beam and pulsing the laser beam at the combustor surface while rotating the combustor relative to the laser beam to form each trepan cut, until a first row of shaped holes is formed in the combustor;

adjusting the positioning of the laser beam to the first predetermined angle and positioning the combustor where the laser beam is at the first predetermined angle relative to the combustor surface and in alignment with the plurality of metering holes; and pulsing the laser beam at the combustor surface to remove debris from within the plurality of metering holes.

20. The method of claim 19, wherein each step of pulsing the laser beam at the combustor surface, adjusting, and pulsing the laser beam at each trepan cut is repeated until a second row of the plurality of shaped holes is formed in the combustor.

* * * * *